2,906,699

ADDING A NITROGEN COMPOUND TO SUPPRESS HYDROCRACKING IN THE REFORMING OF A SULFUR-CONTAINING NAPHTHA

Vladimir Haensel, Hinsdale, and George R. Donaldson, Riverside, Ill., assignors, by mesne assignments, to Universal Oil Products Company, Des Plaines, Ill., a corporation of Delaware No Drawing. Application July 30, 1954
Serial No. 446,968

10 Claims. (Cl. 208—138)

This application is a continuation-in-part of my co-pending application Serial No. 141,172, filed January 28, 1950, now abandoned.

The invention relates to the catalytic conversion of hydrocarbon fractions containing naphthenes and paraffins. It is more specifically concerned with a particular method of reforming straight run gasolines and naphthas in the presence of hydrogen and reforming catalysts capable of promoting hydrocracking of paraffins and dehydrogenation of naphthenes and comprising at least one refractory metal oxide and a metal selected from the group consisting of platinum and palladium.

Reforming catalysts comprising platinum or palladium composited with a cracking component such as silica-alumina, or catalysts comprising platinum-alumina-combined halogen, especially combined fluorine and/or chlorine, are especially useful in the reforming of hydrocarbons. Hydrocracking and isomerization of paraffins and dehydrogenation of naphthenes are among the principal reactions that are promoted by these catalysts which are capable of increasing the octane number of straight run gasolines and naphthas to values that are substantially higher than those that ordinarily can be reached by thermal reforming. In addition, the yield-octane number relationships realized with these catalysts are much better than are the corresponding relationships obtained in thermal reforming and in most of the prior catalytic reforming processes. However, the activity of these catalysts decreases with use for several reasons one of which is the deposition of carbonaceous material thereon. If the activity declines, it is necessary to compensate therefor if a product of constant quality is desired. In any given plant, the most direct and inexpensive way of compensating usually comprises increasing the reaction temperature. However, when this is done, it has been found that hydrocracking is promoted to a greater extent than is the dehydrogenation reaction. Consequently, the balance between these reactions is destroyed and greater losses to light gases as well as greater consumption of hydrogen is encountered because of the relative proportions of hydrocracking. In addition the rate of deactivation or fouling of the catalyst is increased at the higher temperatures.

We have invented a method of controlling or regulating the relative amounts of hydrocracking and dehydrogenation, and, in particular, we have invented a method of suppressing the tendency toward increased hydrocracking as the reaction temperature is increased.

In one embodiment our invention relates to an improvement in the reforming of a hydrocarbon fraction containing paraffins and naphthenes and boiling approximately within the gasoline range by passing the same with hydrogen through a catalyst capable of promoting hydrocracking of paraffins and dehydrogenation of naphthenes and containing at least one refractory oxide and a metal selected from the group consisting of platinum and palladium at reforming conditions that promote paraffin hydrocracking and naphthene dehydrogenation, said improvement comprising adding a basic hydrocracking suppressor to the reforming zone and regulating the amount added thereto to control said hydrocracking.

In a more specific embodiment our invention relates to a reforming process which comprises continuously contacting hydrogen and a normally liquid hydrocarbon fraction containing paraffins and naphthenes and boiling below about 425° F. with a catalyst capable of promoting hydrocracking of paraffins and dehydrogenation of naphthenes and comprising at least one refractory oxide and a metal selected from the group consisting of platinum and palladium, at reforming conditions, increasing the reaction tempearture at intervals to compensate for loss in catalyst activity and adding a halogen-free, nitrogen-containing compound to the reforming zone to suppress the tendency toward increased hydrocracking and regulating the amount of said compound to obtain the desired degree of hydrocracking.

Certain of the catalysts herein referred to, particularly those comprising platinum or palladium and a cracking component become deactivated relatively rapidly by deposition of carbonaceous material thereon, with the result that they must be regenerated frequently if they are to be used for economical periods of time. It has been discovered that the tendency toward fouling is due to the high cracking or hydrocracking activity of these catalysts. We have found that by adding a basic hydrocracking suppressor to the reforming zone, the hydrocracking activity can be reduced with a concommitant reduction in the catalyst fouling rate. By adding an appropriate amount of basic hydrocracking suppressor the fouling rate can be reduced to a point at which the catalyst can be used for months without regeneration. As a consequence, reforming plants employing such catalysts can be built without regeneration facilities, thereby effecting great savings in initial investment. In addition, marked savings in operating cost are made possible by the omission of the regeneration step.

In summary, a principal advantage of our process is that it makes possible the reforming of straight run gasolines and the like with certain of the catalysts herein specified in a non-regenerative type of process. Further, many charge stocks contain substances such as sulfur and when the charge stock contains a large amount of sulfur the hydrocracking may be too high, and it would be desirable to reduce the hydrocracking to insure a higher yield and a better product distribution. When sulfur is the substance in the charge stock resulting in an excess of hydrocracking, one possible method of remedying the excessive hydrocracking is to desulfurize the charge stock, however, this entails a separate treatment of the charge stock. According to the method of our invention the effect of sulfur may be counteracted by the addition of a basic hydrocracking suppressor to the reaction zone. We have also found that when the latter step is used instead of desulfurization that in many cases better yields and octane numbers are obtained at substantially the same operating conditions.

As hereinbefore mentioned, an especially useful embodiment of our invention comprises the use of a basic hydrocracking suppressor to reduce the tendency toward increased hydrocracking as the reaction temperature is raised during the course of a reforming run employing a catalyst capable of promoting hydrocracking of paraffins and dehydrogenation of naphthenes and comprising at least one refractory metal oxide and a metal selected from the group consisting of platinum and palladium. The higher temperature in the reforming zone is usually necessary when the catalyst becomes partly deactivated, that is the catalyst may possess insufficient dehydrogenation activity at a certain temperature and the catalyst temperature must be raised to obtain the desired conversion to aromatics. When the temperature must be raised to obtain a higher conversion to aromatics and when a basic hydrocracking suppressor is added to the reaction zone, we have found that the product distribution obtained is much better and the yield obtained is often larger than at the lower temperature. However, it has been observed that the hydrocracking activity occasionally increases, at least for a period of time, even though the reaction temperature is maintained at a constant level. The exact reason for the gain in activity is not known but there are indications that the gain is due to dehydration of the catalyst or to an increase in the impurity content of the same brought about by absorption or reaction with impurities present in the charge stock, that promote hydrocracking. Both of these changes affect the selectivity of the catalyst in a manner such that hydrocracking reactions are increased relative to naphthene dehydrogenation reactions. In such a case, a basic hydrocracking suppressor may be added to the reaction zone to again bring the hydrocracking and hydrogenation reaction back into balance.

In a broad aspect our invention relates to the addition of basic hydrocracking suppressors to reforming operations to control the balance between the various reactions promoted by a catalyst comprising at least one refractory oxide and a metal selected from the group consisting of platinum and palladium, said catalyst being capable of promoting hydrocracking and aromatization reactions. The amount of hydrocracking can be substantially independently regulated by addition of a basic hydrocracking suppressor to the reaction zone with little effect on the other reactions promoted by the catalysts. Thus the use of these suppressors permits greater flexibility in catalyst composition with resulting benefits to catalyst life and product quality.

Another useful application of our invention is in the production of aromatics by the dehydrogenation of charge stocks consisting essentially of naphthenes with a catalyst of the type herein described. The basic additive suppresses hydrocracking of the naphthenes and thus makes possible greater yields of aromatics.

The hydrocarbon stocks that will be converted in accordance with our process comprises hydrocarbon fractions containing naphthenes and paraffins. The preferred stocks are those consisting essentially of naphthenes and paraffins, although in some cases aromatics and/or olefins also may be present. This preferred class includes straight run gasolines, natural gasolines, and the like. On the other hand, it frequently is advantageous to charge thermally or catalytically cracked gasoline or higher boiling fractions thereof to our reforming process. The gasoline may be a full boiling range gasoline having an initial boiling point from about 50° F. to about 100° F. and an end boiling point within the range of from about 325° F. to about 425° F. or it may be a selected fraction thereof which usually will be a higher boiling fraction, commonly referred to as naphtha and generally having an initial boiling point within the range of from about 125° F. to about 250° F. and an end boiling point within the range of from about 350° F. to about 425° F.

The reforming catalysts used in our process comprise those catalysts containing at least one refractory oxide and a metal selected from group VIII of the periodic table having an atomic weight greater than 100, said metal preferably being platinum or palladium, that are capable of promoting hydrocracking of paraffins and dehydrogenation of naphthenes. A preferred type of catalyst that falls in this category are those described in U.S. Patent No. 2,479,109 issued August 16, 1949. These catalysts comprise alumina, platinum and combined halogen, especially combined fluorine and combined chlorine. They are prepared by forming a mixture of alumina and a halogen compound, the halogen being in an amount of from about 0.05% to about 3% by weight of said alumina on a dry basis, and thereafter compositing about 0.01% to about 1% by weight of platinum with the mixture and subsequently heating the composite.

Another group of catalysts that may be used in the present process comprises a cracking component and a metal selected from the group consisting of platinum and palladium. The cracking component ordinarily will comprise silica and at least one other metal oxide usually selected from the group consisting of alumina, zirconia, magnesia and thoria. Another type of cracking component that may be used in these catalysts comprises alumina-boria composites. These catalysts are made, for example, by drying a composite of silica hydrogel and alumina hydrogel and thereafter incorporating into the dried composite a metal from the group consisting of platinum and palladium in an amount of from about 0.01% to about 1% by weight. Further details concerning the preparation of catalysts of this type will be found in U.S. Patent No. 2,478,916.

The basic hydrocracking suppressors that may be used in our process comprise those compounds that exhibit basic properties under the conditions prevailing in the reforming zone. Such material includes compounds that exhibit basic properties under normal conditions and are not decomposed or altered in the reaction zone except by reaction with the catalyst. Also included, are compounds that may or may not exhibit basic properties under normal conditions, but which in the reaction zone are decompoed or altered to compounds that exhibit a net basicity. One preferred group of basic hydrocracking suppressors that may be used in our process comprises halogen-free nitrogen-containing compounds which are convertible to ammonia at conditions prevailing in the reforming zone. These compounds include ammonia; hydrazine; nitrogen oxides; nitrates and nitrites such as sodium and potassium nitrate and nitrite; aliphatic and aryl nitro compounds such as nitromethane, dinitromethane, and nitrobenzene; nitroses compounds; primary secondary, and tertiary aliphatic and aryl amines such as tertiary-butyl-amine and analine; quaternary ammonium compounds; heterocyclic organic nitrogen compounds such as pyrrole, pyridine and derivatives thereof, and quinoline. Ammonia is an example of a compound that exhibits basic properties under normal conditions and which also exhibits basic properties under the conditions of the reaction zone. On the other hand, nitromethane is an example of a compound which does not exhibit any substantial basic properties under normal conditions but which, under the conditions of the reaction zone, is converted in part to ammonia. As hereinbefore mentioned those halogen-free nitrogen-containing compounds which are suitable for our process are those which are convertible to ammonia at the conditions in the reaction zone.

Another group of basic hydrocracking suppressors that may be used in the present process comprises the alkali and alkaline earth metal oxides and hydroxides including the oxides and hydroxides of potassium, sodium, lithium, rubidium, caesium, calcium, barium and strontium.

Still another group of suitable compounds includes halogen-free phosphorus compounds which, under the operating conditions maintained in the reforming zone, exhibit basic properties. Such compounds include phosphine, primary, secondary and tertiary alkyl and aryl phosphines; and phosphinic acids. In general, the phosphorus compounds are less basic than are the nitrogen compounds.

If the nitrogen or phosphorus compounds contain halogen, there is a strong likelihood that they will be hydrocracking activators rather than hydrocracking suppressors. This is for the reason that upon decomposition in the reforming zone, halogen or hydrogen halide probably will be formed therefrom. These materials are active hydrocracking promoters.

The non-halogen nitrogen-containing compounds are preferred to use in our process since they do not leave undesirable deposits on the catalyst, and further they have proved to be most satisfactory in operation.

Hydrocarbons may be reformed in accordance with our process using fluidized, fluidized-fixed bed, suspensoid, or moving bed types of processes. However, we prefer to use fixed bed processes, primarily because processes of this type tend to minimize attrition losses of the relatively expensive catalysts. One fixed bed method of utilizing our invention comprises preheating hydrogen and hydrocarbon charge stocks to a conversion temperature and passing the same in admixture with a hydrocracking suppressor through a plurality of substantially adiabatic reaction zones containing a catalyst of the type described. In all but the last stages, the reaction is endothermic, hence the reactant streams passing between the reaction zones are reheated to the desired temperature. The reformed hydrocarbons are recovered, and the hydrogen is separated and recycled to the reaction zone. Another type of fixed bed process that is particularly suitable for certain types of operations comprises passing the hydrocarbon charging stock together with hydrogen and the requisite amount of basic hydrocracking suppressor through tubes containing catalysts, said tubes being subjected to radiant heat from a radiant flame and the resulting hot products of combustion. Here again the reformate is recovered and the hydrogen is separated and recycled to the reaction zone. Hydrocarbon reforming operations carried out in accordance with our invention ordinarily will be conducted at temperatures of from about 600° F. to about 1000° F.

The pressures at which our process will be conducted will lie within the range of from about 50 to 1500 pounds per square inch; a total pressure of at least 200 pounds ordinarily is preferred. The weight hourly space velocity, which is defined as the weight of hydrocarbons charged per hour per weight of catalyst in the reaction zone, should lie within the range of from about 0.2 to about 40. The amount of hydrogen charge along with the hydrocarbons usually will be from about 0.5 to about 20 mols per mol of hydrocarbon.

The amount of basic hydrocracking suppressor required to obtain the desired degree of hydrocracking suppression depends upon the operating conditions in the reaction zone as well as the amount of hydrocracking activators and/or suppressors that may already be in the charge stock, however, the amount usually can be determined by simple experimentation. For example, it is possible to ascertain whether the amount of basic hydrocracking suppressors being added to the charging stock in a multiple adiabatic reaction system is correct by observing the total temperature drop through the reactors. For example, if a fresh catalyst is giving a satisfactory product distribution at a given total temperature differential or delta T, then the amount of hydrocracking suppressor added as the run progresses and the reaction temperature is increased should be such as to hold the total delta T substantially constant. If this procedure is followed, the ratio between hydrocracking and aromatization will be held substantially constant and, consequently, the product distribution will remain approximately the same as that experienced early in the run. However, if a substantial change in heat capacity of the material in the reaction zone has taken place by means such as a variation in the ratio or the composition of the recycle gas, this fact should be taken into account. In such a case, a more accurate procedure should be to keep the product of heat capacity and delta T substantially constant in order that the ratio between hydrocracking and aromatization be maintained substantially constant.

A relatively simple method of determining the correct amount of basic hydrocracking suppressor to be added is to observe the composition of the reformate, particularly the degree of hydrocracking being obtained, and to adjust the basic hydrocracking suppressor content of the reaction mixture to give the desired degree of hydrocracking.

As hereinbefore mentioned the amount of non-halogen nitrogen-containing compound to be added to the reaction zone is controlled somewhat by the amount of substances present in the feed stock which affect the product or the hydrocracking. For example, sulfur in the charge stock results in a net increase in hydrocracking when using catalysts of the type used in our invention. Should the charge stock contain low amounts of sulfur, only a small amount of non-halogen nitrogen-containing compound will be necessary to suppress and control the hydrocracking at the level desired. In other cases when the charge stock contains a large amount of sulfur larger amounts of nitrogen-containing compound may be necessary to suppress the hydrocracking and to control the hydrocracking at the level desired. Generally, the amount of non-halogen nitrogen-containing compound added to the reforming zone will be from about 2 parts per million to about 200 parts per million by weight of nitrogen based on the weight of charge stock entering the reaction zone. It is, therefore, necessary when using a nitrogen-containing compound to calculate the weight of nitrogen that this compound contains since the concentration of from 2 to about 200 parts per million represents the weight concentration of the compound calculated as weight parts of nitrogen. When the charge stock is relatively sulfur free, that is, the concentration of sulfur in the charge stock is below about 0.06% by weight, the nitrogen added will usually be from about 2 to about 100 parts per million. However, at concentrations of sulfur above this, larger amounts of nitrogen up to about 200 parts per million may be necessary. Some charge stocks contain nitrogen containing compounds, however, the added amount of 2 to about 200 parts per million is additional to that amount already in the feed. The added nitrogen is considered separate and apart from any nitrogen that may naturally already be in the feed.

In the operation of our process, the halogen-free, nitrogen-containing compound may be added in the required amounts to the charging stock or they may be added directly to the reaction zone. They are added independently of the catalyst, however, and the amount added is not intended to include any hydrocracking suppressor that may naturally be in the charge stock.

From the foregoing, it can be seen that we have invented an improved process for the reforming of hydrocarbons in the presence of certain platinum-containing or palladium-containing catalysts, said process resulting in more uniform product composition and longer catalyst life. In particular, we have invented a method of controlling the amount of hydrocracking in such processes. An important advantage of our process, in addition to those hereinbefore enumerated, lies in the altered composition of the reformate when using a basic hydrocracking suppressor. For example, the addition of considerably less than 1% of pyridine to a straight run gasoline charge stock suppressed the formation of higher boiling aromatics but had substantially no effect on the yield of the more valuable, lower aromatics such as benzene, toluene, xylenes, and ethylbenzene.

An additional advantage of our process, especially when using nitrogen-containing hydrocracking suppressors, lies in the fact that the catalyst fouling rate often can be reduced to a point at which recycle of hydrogen to the reforming zone can be dispensed with, or at least decreased. In such cases, the hydrogen produced in the reaction zone by naphthene dehydrogenation reactions is sufficient, or nearly sufficient, to saturate the hydrocarbon fragments formed therein, and the excess hydrogen normally provided to repress catalyst carbon formation can be done away with. Reducing the amount of hydrogen recycle lowers the pressure drop through the system with a concomitant reduction in operating costs.

The following examples are given to illustrate our invention, but it is to be understood that they are given for illustrative and not for limitative purposes.

*Example I*

A desulfurized Mid-Continent naphtha fraction having an initial boiling point of 200° F. and an end boiling point of 385° F. was reformed in the presence of a platinum-alumina-combined halogen catalyst at a liquid hourly space velocity of 1.5, 300 pounds per square inch pressure and in the presence of hydrogen at a hydrogen to hydrocarbon mol ratio of 10:1, A 90 F-1 clear octane number product was desired from the operation and this required an average catalyst temperature of 912° F. The operation resulted in a yield of $C_5$ plus product of 80.5% by weight and the aromatic content of the product was 47.5% by weight. Nitrogen was added to the charge stock in the form of pyridine to give a concentration calculated to be 25 parts per million of nitrogen. The hydrocracking activity of the catalyst dropped when the nitrogen was added and in order to obtain a 90 F-1 clear octane number it was necessary to raise the temperature to 936.5° F. If nitrogen were not present, raising the temperature to 936.5° F. would have resulted in excessive hydrocracking and large amounts of coke would deposit on the catalyst and deactivate the same. In the presence of nitrogen, however, the level of hydrocracking was substantially the same as at the 912° F. temperature in the absence of nitrogen. Further, in the present experiment raising the temperature to 936.5° F. and adding nitrogen was beneficial since the aromatic content of the product was increased to 49.5% by weight and at the same time the yield was increased to 81.3% by weight of the charge. It is thus clearly illustrated that it is beneficial to add nitrogen and run at a higher temperature since this increases the amount of aromatic recovered and increases the yield.

*Example II*

A Kuwait straight run naphtha having an initial boiling point of 262° F. and an end boiling point of 383° F. was reformed at 500 pounds per square inch, 2.0 liquid hourly space velocity and 9:1 hydrogen to hydrocarbon molal ratio in the presence of a catalyst comprising alumina, 0.4% platinum and 0.5% by weight of fluorine. The charge stock contained approximately 1.2% by weight of sulfur. The average temperature required to obtain an 85 F-1 clear octane number was 912° F. The reforming operation resulted in a large yield of gas which indicated excess hydrocracking. 79.7% by volume of $C_5$ plus reformate was recovered. The product contained 47.5% by weight of aromatics. When the run at substantially the same operating conditions was performed, however, this time using the Kuwait charge stock free of sulfur, the hydrocracking was considerably less and the reforming resulted in a liquid volume recovery of $C_5$ plus reformate of 83.8%. The product contained 51.22% of aromatics. The temperature was adjusted to an 85 F-1 clear octane number and the average temperature requirement to obtain this octane number was 914° F.

This illustrates that removing the sulfur before charging the naphtha results in a better product, however, as hereinbefore mentioned in the specification this requires a separate desulfurization treatment.

The sulfur containing Kuwait naphtha fraction was again reformed at substantially the same operating conditions to obtain an 85 F-1 clear octane number, however, in this operation pyridine was added to the charge stock to give a nitrogen concentration in the charge stock of approximately 160 parts per million. The temperature requirement to obtain the 85 F-1 clear octane number was 964.4° F. average catalyst temperature. The reforming operation resulted in a yield of $C_5$ plus reformate of 81.2% by volume and the aromatic content of the reformate was 52.5. Further, the hydrocracking at the higher temperature of 964.4° F. was not excessive and excess carbon did not deposit on the catalyst.

This example clearly illustrates that when a nitrogen-containing hydrocracking suppressor is added to a reforming operation that a better yield and better aromatic recovery is obtainable. Further, the data show that the results obtained by adding nitrogen to a sulfur containing charge stock are comparable to those obtained should the charge stock first be desulfurized and as hereinbefore mentioned a desulfurization must necessarily be a separate treatment and the economics of the situation are much in favor of the addition of a non-halogen nitrogen-containing compound instead of desulfurization.

We claim as our invention:

1. In the reforming of a hydrocarbon fraction containing sulfur compounds, paraffins and naphthenes and boiling approximately within the gasoline range by passing the same with hydrogen through a catalyst capable of promoting hydrocracking of paraffins and dehydrogenation of naphthenes and containing at least one refractory oxide and a metal selected from the group consisting of platinum and palladium at reforming conditions that promote paraffin hydrocracking and naphthene dehydrogenation, the improvement which comprises adding a basic halogen-free, nitrogen-containing hydrocracking suppressor to the reforming zone and regulating the amount added thereto to control said hydrocracking.

2. The improvement set forth in claim 1 further characterized in that said hydrocracking suppressor is added in an amount to provide a nitrogen concentration of from about 2 to 200 parts per million based on the weight of charge to said reforming process.

3. A reforming process which comprises continuously contacting hydrogen and a normally liquid hydrocarbon fraction containing sulfur compounds, paraffins and naphthenes and boiling below about 425° F. with a catalyst capable of promoting hydrocracking of paraffins and dehydrogenation of naphthenes and comprising at least one refractory oxide and a metal selected from the group consisting of platinum and palladium at reforming conditions that promote paraffin hydrocracking and naphthene dehydrogenation, and adding to said hydrocarbon fraction a halogen-free, nitrogen-containing compound in an amount to regulate the degree of hydrocracking.

4. The process of claim 3 further characterized in that the compound added to the hydrocarbon fraction is a heterocyclic organic nitrogen compound.

5. The process of claim 3 further characterized in that the compound added to the hydrocarbon fraction is pyridine.

6. The process of claim 3 further characterized in that the compound added to the hydrocarbon fraction is ammonia.

7. A reforming process which comprises continuously contacting hydrogen and a normally liquid hydrocarbon fraction containing sulfur compounds, paraffins and naphthenes and boiling below about 425° F. with a catalyst capable of promoting hydrocracking of paraffins and dehydrogenation of naphthenes and comprising at least one refractory oxide and a metal selected from the group consisting of platinum and palladium, at reforming conditions, increasing the reaction temperature at intervals to compensate for loss in catalyst activity and adding a halogen-free, nitrogen-containing compound to the reforming zone to suppress the tendency toward increased hydrocracking and regulating the amount of said compound to obtain the desired degree of hydrocracking.

8. In the reforming of a gasoline fraction containing paraffins, naphthenes and sulfur compounds in the presence of hydrogen and a platinum catalyst having paraffin hydrocracking and naphthene dehydrogenating activity, the improvement which comprises adding to the reforming zone a basic nitrogen-containing compound in an amount to provide a nitrogen concentration of from about 2 to about 200 parts per million based on the weight of the gasoline fraction charged to the process.

9. The improvement of claim 8 further characterized in that said basic compound is pyridine.

10. The improvement of claim 8 further characterized in that said basic compound is ammonia.

References Cited in the file of this patent

UNITED STATES PATENTS

| | | |
|---|---|---|
| 2,352,236 | Thomas | June 27, 1944 |
| 2,470,109 | Haensel | Aug. 16, 1949 |
| 2,566,353 | Mills | Sept. 4, 1951 |
| 2,642,383 | Berger et al. | June 16, 1953 |
| 2,642,385 | Berger | June 16, 1953 |

OTHER REFERENCES

Mills et al.: Jour. Am. Chem. Soc., vol. 72, No. 4, pages 1554–60, April 1950.